United States Patent [19]

Quaeck

[11] Patent Number: 5,332,081
[45] Date of Patent: Jul. 26, 1994

[54] RECIPROCATING CONVEYOR HAVING DETACHABLE DRIVE UNIT

[76] Inventor: Manfred W. Quaeck, 1515 - 210th Ave. NE., Redmond, Wash. 98053

[21] Appl. No.: 45,525

[22] Filed: Apr. 6, 1993

Related U.S. Application Data

[63] Continuation-in-part of Ser. No. 978,913, Nov. 19, 1992, Pat. No. 5,222,590.

[51] Int. Cl.⁵ ............................................. B65G 25/00
[52] U.S. Cl. ................................. 198/750; 414/525.1
[58] Field of Search ................. 198/750; 414/525.1, 414/525.9

[56] References Cited

U.S. PATENT DOCUMENTS

| | | |
|---|---|---|
| Re. 33,196 | 4/1890 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom ............................ 198/750 |
| 4,492,303 | 1/1985 | Foster . |
| 4,580,678 | 4/1986 | Foster . |
| 4,611,708 | 9/1986 | Foster . |
| 4,679,686 | 7/1987 | Foster . |
| 4,691,819 | 9/1987 | Hallstrom . |
| 4,709,805 | 12/1987 | Foster ............................... 198/750 |
| 4,727,978 | 3/1988 | Hallstrom . |
| 4,749,075 | 6/1988 | Foster . |
| 4,785,929 | 11/1988 | Foster . |
| 4,793,469 | 12/1988 | Foster ............................... 198/750 |
| 4,856,645 | 8/1989 | Hallstrom . |
| 4,940,132 | 7/1990 | Foster . |
| 4,966,275 | 10/1990 | Hallstrom, Jr. ..................... 198/750 |
| 5,000,647 | 3/1991 | Foster ............................ 198/750 X |
| 5,064,052 | 11/1991 | Foster . |
| 5,088,595 | 2/1992 | Hallstrom, Jr. ..................... 198/750 |
| 5,092,732 | 3/1992 | Foster ............................ 198/750 X |
| 5,096,356 | 3/1992 | Foster ............................ 198/750 X |
| 5,103,866 | 4/1992 | Foster . |
| 5,125,502 | 6/1992 | Foster ............................... 198/750 |
| 5,165,524 | 11/1992 | Foster ............................... 198/750 |
| 5,165,525 | 11/1992 | Quaeck ............................... 198/750 |

*Primary Examiner*—D. Glenn Dayoan
*Attorney, Agent, or Firm*—Graybeal Jackson Haley & Johnson

[57] ABSTRACT

A drive mechanism for a reciprocating floor conveyor, wherein the conveyor has a plurality of individually reciprocatable groups of slats, includes a drive cylinder for each of the slat groups located adjacent to an end of the slats. A cross-member for each of the slat groups fixedly secures all of the slats of the slat group. A drive rod for each of the slat groups connects one of the drive cylinders and one of the cross-members. The slats are on a slat-supporting frame, and the drive mechanism is on a drive supporting frame that is under the slat-supporting frame. The slat-supporting frame and drive-supporting frame are separable such that the slats can be detached from the drive mechanism.

37 Claims, 8 Drawing Sheets

RECIPROCATING CONVEYOR HAVING DETACHABLE DRIVE UNIT

This application is a continuation-in-part of U.S. patent application Ser. No. 07/978,913 filed Nov. 19, 1992 entitled RECIPROCATING FLOOR CONVEYOR DRIVE MECHANISM now U.S. Pat. No. 5,222,590.

BACKGROUND OF THE INVENTION

Reciprocating floor conveyors are generally employed for transport of liquid bearing material such as, for example, garbage. Liquid impermeable reciprocating floor conveyors comprised of a plurality of slat groups are known in the art. These liquid-tight reciprocating floor conveyors are often employed in containers such as truck or trailer boxes, transport containers, or fixed installation containers, each having a bottom, two sides, two ends (one of which is openable), and, optionally a top. The liquid-tight reciprocating floor conveyor is supported by the bottom of the container.

Drive mechanisms for reciprocating floor conveyors are generally located under the slats of the reciprocating floor. However, such a drive mechanism location is inappropriate for liquid impermeable reciprocating floor conveyors. Mounting a drive mechanism underneath a liquid-tight reciprocating floor conveyor is extremely laborious, and very costly. Specifically, an extensive hose and tubing system is required to connect the hydraulic fluid supply located at the front of the container to the drive units located underneath the reciprocating floor conveyor. Furthermore, to install the drive mechanism underneath the reciprocating floor conveyor requires that the container bottom have large openings therein. These openings compromise the structural integrity of the container bottom which results in bending and shear forces being translated from this unstable container bottom to the slats of the reciprocating floor conveyor; the result being excessive slat wear and damage.

U.S. Pat. Nos. 5,125,502 and 5,096,356 issued to Foster disclose a drive mechanism for a reciprocating floor conveyor which is located not underneath, but at an end of the reciprocating floor conveyor. The Foster conveyor comprises a plurality of elongated load supporting floor members supported for longitudinal back and forth movement within a material receiving compartment. A drive assembly compartment is provided at one end of the material receiving compartment. A bulkhead is positioned between the material receiving compartment and the drive assembly compartment. A plurality of piston-cylinder drive units are positioned within the drive assembly compartment. Each drive unit is associated with a separate set of the floor members. The drive units are operated to move the floor members longitudinally. Each drive unit includes longitudinally extending drive rods, one for each of its floor members. The drive rods extend from the drive units through the bulkhead, into the material receiving compartment and are connected to the floor members within the material receiving compartment. The bulkhead is provided with a plurality of bushings, one for each drive rod. The drive rods extend through the bushings. The bushings include seals for sealing against liquid leakage from the material receiving compartment, through the bushings, and into the drive assembly compartment.

The above Foster drive mechanism suffers from the following shortcomings. First, the drive mechanism is located within the container itself, thus decreasing the effective slat length of the reciprocating floor conveyor available, which decreases the volume of the load to be carried in a given container. Additionally, the location of the drive mechanism within the container results in limited access to the drive mechanism for repair and maintenance. Second, Foster employs one drive rod for each slat of the reciprocating floor conveyor. This configuration is unduly complex, thus being susceptible to component failure and is unduly costly. More importantly, the excessive number of drive rods results in numerous openings in the bulkhead through which the drive rods pass to their connected slats. Every one of these openings in the bulkhead is potential source of liquid leakage. Third, each bulkhead opening requires a bushing which surrounds the drive rod. These bushings are another potential source of liquid leakage.

Finally, U.S. Pat. No. 4,966,725 issued to Hallstrom, Jr., U.S. Pat. No. 5,000,647 issued to Foster, and U.S. Pat. No. 5,092,732 issued to Foster all disclose reciprocating floor conveyors having a separable floor unit and power drive unit with the power drive unit located under the container that houses the floor unit.

A need thus exists for a drive mechanism for a reciprocating floor conveyor in which the drive mechanism is located at an end of the reciprocating floor conveyor container.

A need exists for a reciprocating floor conveyor having a separable floor unit and drive mechanism wherein the drive mechanism is located at an end of the container that houses the floor unit.

A need exists for a drive mechanism for a reciprocating floor conveyor in which the drive mechanism includes a number of drive rods equal to the number of cross-members employed, and not equal to the total number of slats employed, in order to reduce complexity and cost of the mechanism and to minimize the number of openings in the partitioning bulkhead to minimize liquid leakage.

A need also exists for the above type of reciprocating floor conveyor drive mechanism in which bushings in the partitioning bulkhead openings which surround the drive rods are not necessary, thus further reducing the chance of liquid leakage.

SUMMARY OF THE INVENTION

A drive mechanism is employed with a reciprocating floor conveyor having a plurality of individually reciprocatable groups of slats. The drive mechanism includes a drive cylinder for each of the slat groups that is located adjacent to an end of the slats. A cross-member for each of the slat groups fixedly secures all of the slats of the slat group. A drive rod for each of the slat groups connects one of the drive cylinders and one of the cross-members. A wall separates the cross-members and the drive cylinders, with the drive rods extending through the wall, and the drive cylinders abutting the wall to prevent liquid leakage through the wall.

Preferably, the slats are on a slat supporting-frame, and the drive mechanism is on a drive-supporting frame that is under the slat supporting frame. The slat-supporting frame and the drive-supporting frame are separable such that the slats can be detached from the drive mechanism.

Preferably, the drive mechanism is employed with a reciprocating floor conveyor having three liquid impermeable slat groups, and the drive mechanism has three drive cylinders, three cross-members and three drive rods. The cross-members each have longitudinal edges which are beveled to minimize deposits of conveyed material between the cross-members. The cross-members are each secured to the slats by fixing each of the slats between the cross-members and a bar under the slat. A substantially planar shield over the cross-members prevents the material being conveyed from contacting the cross-members.

The slat groups are preferably contained in a compartment and the drive cylinders are located externally of the compartment. The wall between the cross-members and the drive cylinders is preferably an end wall of the compartment.

BRIEF DESCRIPTION OF DRAWINGS

The foregoing objects and attendant advantages of this invention will become more readily appreciated as the same becomes better understood by reference to the following detailed description when taken in conjunction with the accompanying drawings wherein.

DETAILED DESCRIPTION OF THE PREFERRED EMBODIMENT

Figure 1:
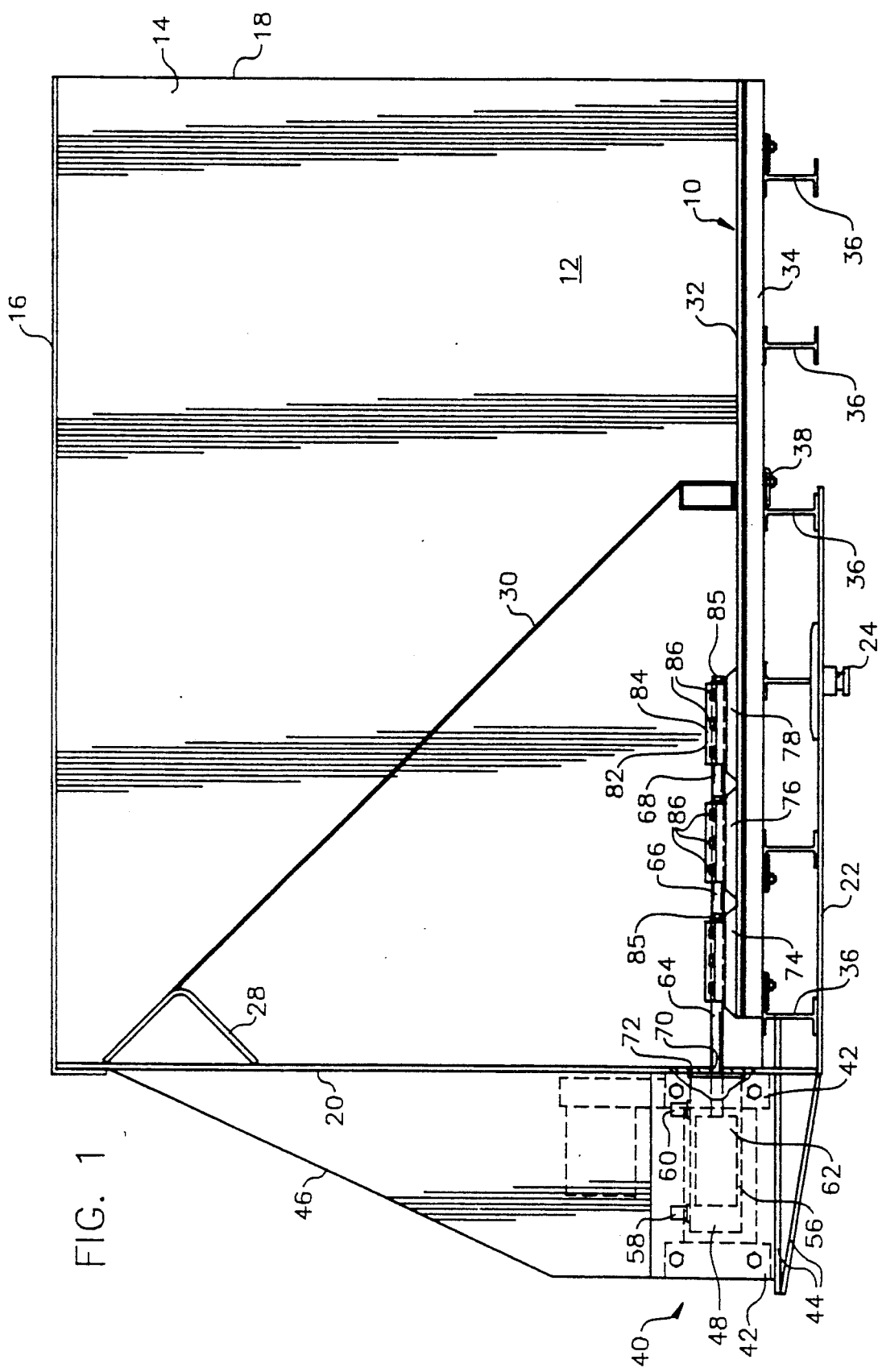
FIG. 1 is an exposed side view of the drive mechanism and reciprocating floor conveyor of the first embodiment present invention.
Figure 2:
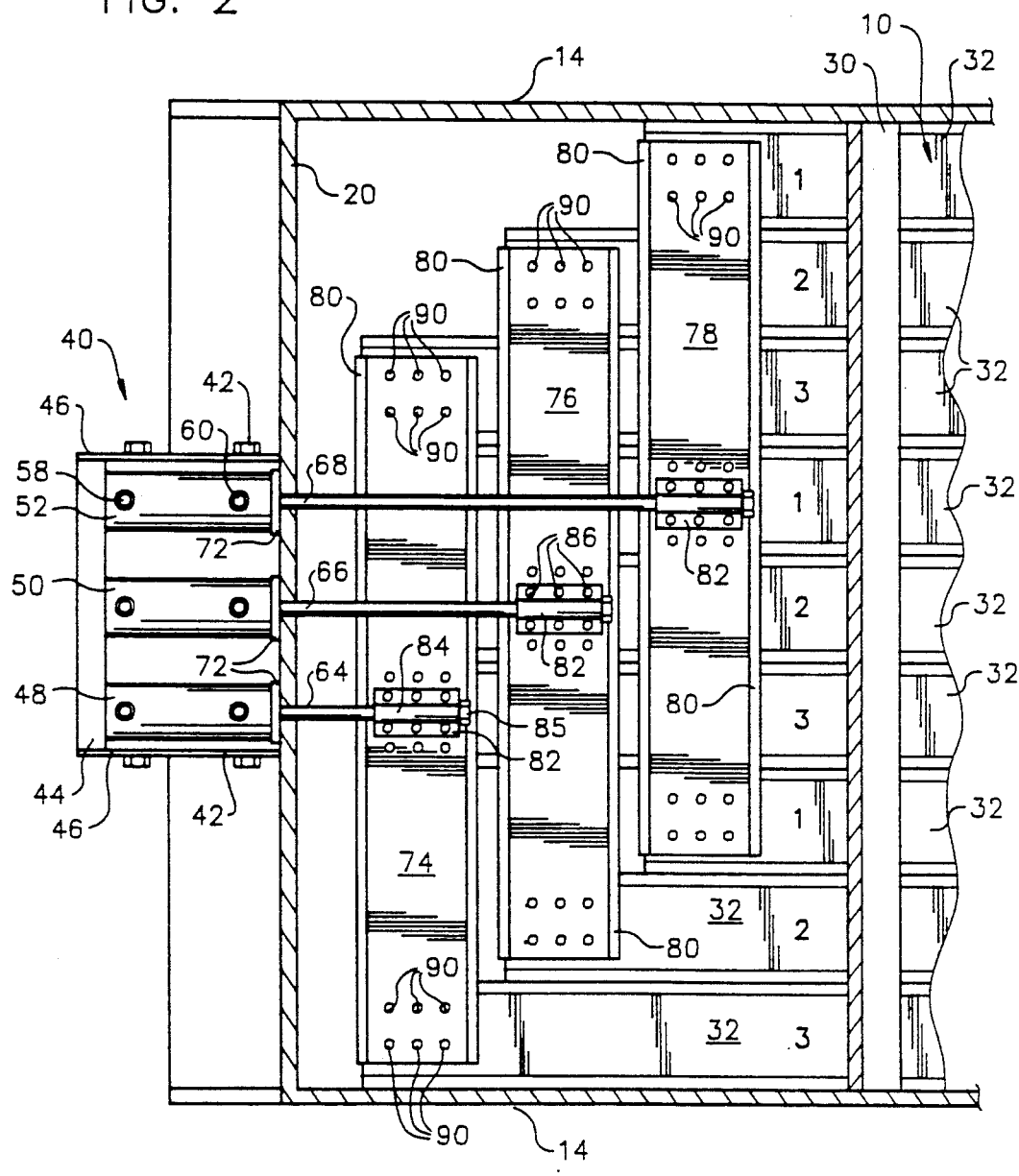
FIG. 2 is an enlarged top view of the drive mechanism and reciprocating floor conveyor of the first embodiment present invention.
Figure 3:
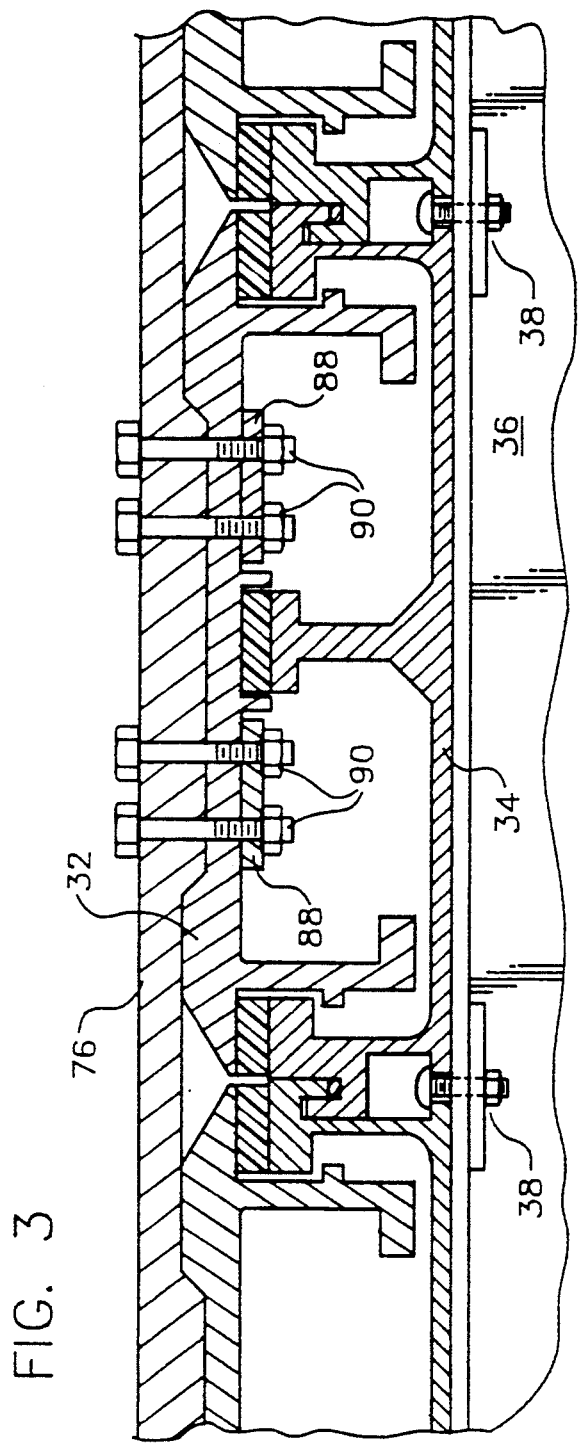
FIG. 3 is an enlarged, partially exposed end view of the cross-members and slats of the drive mechanism and reciprocating floor conveyor of the first embodiment present invention.
Figure 4:
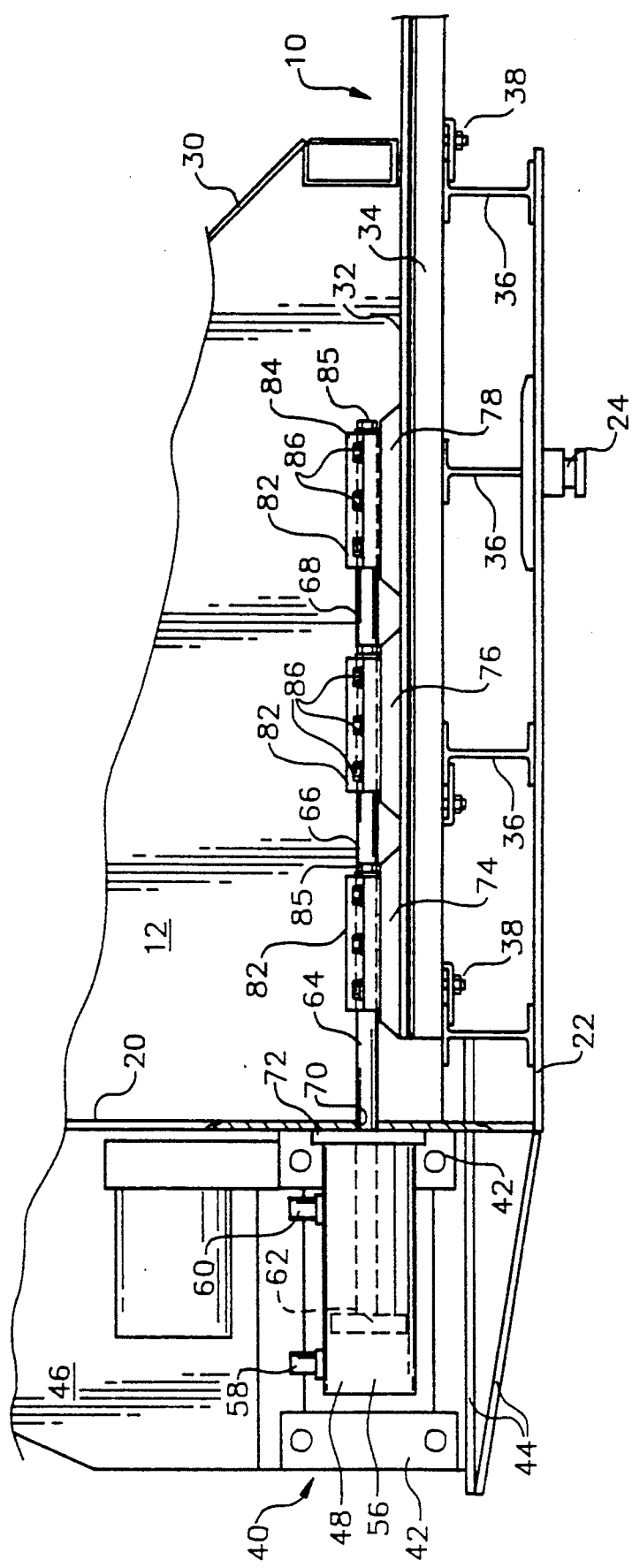
FIG. 4 is an enlarged, partially exposed side view of the drive mechanism of the first embodiment present invention.
Figure 5:
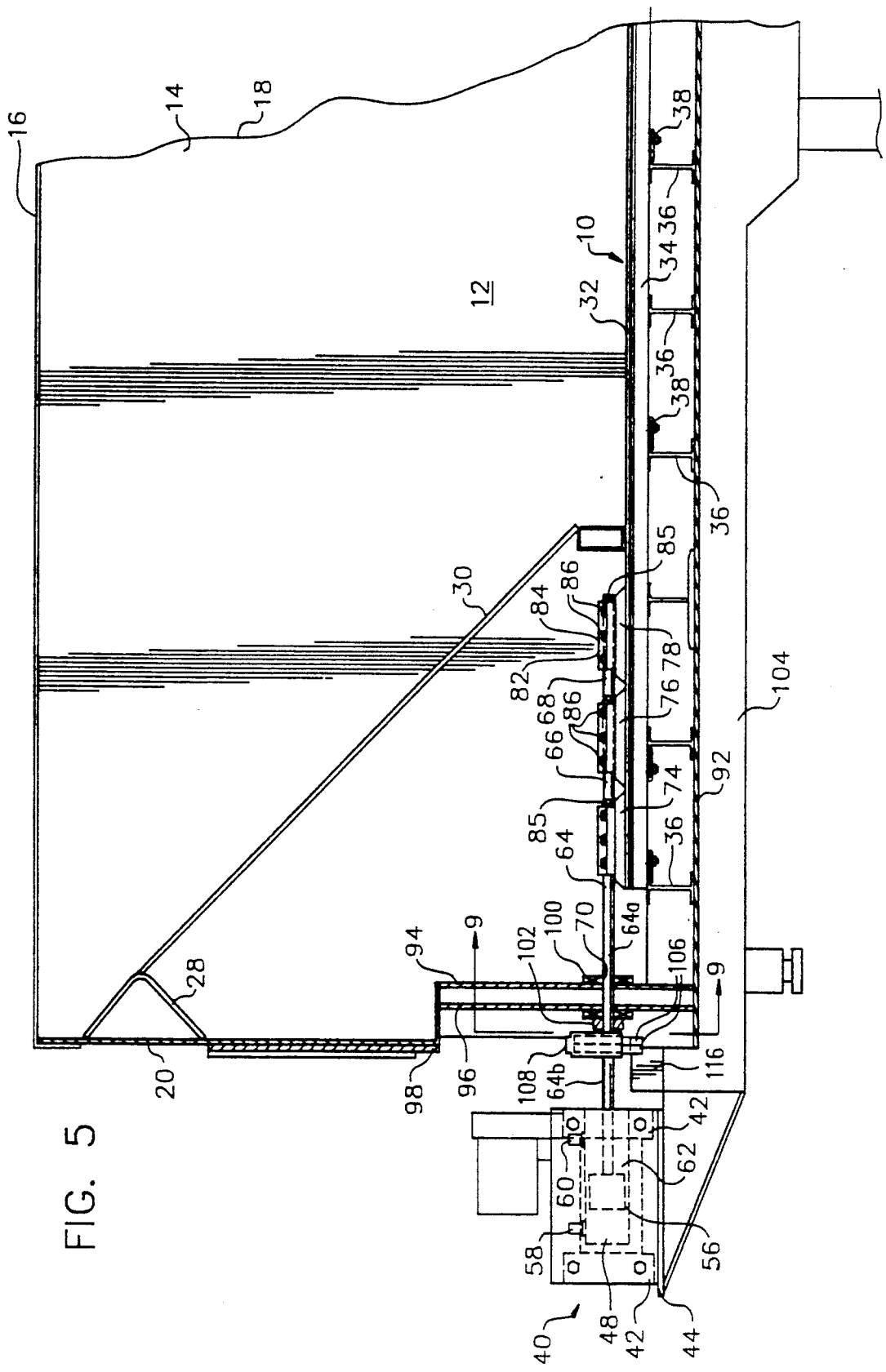
FIG. 5 is an exposed side view of the drive mechanism and reciprocating floor conveyor of the second embodiment present invention.
Figure 6:
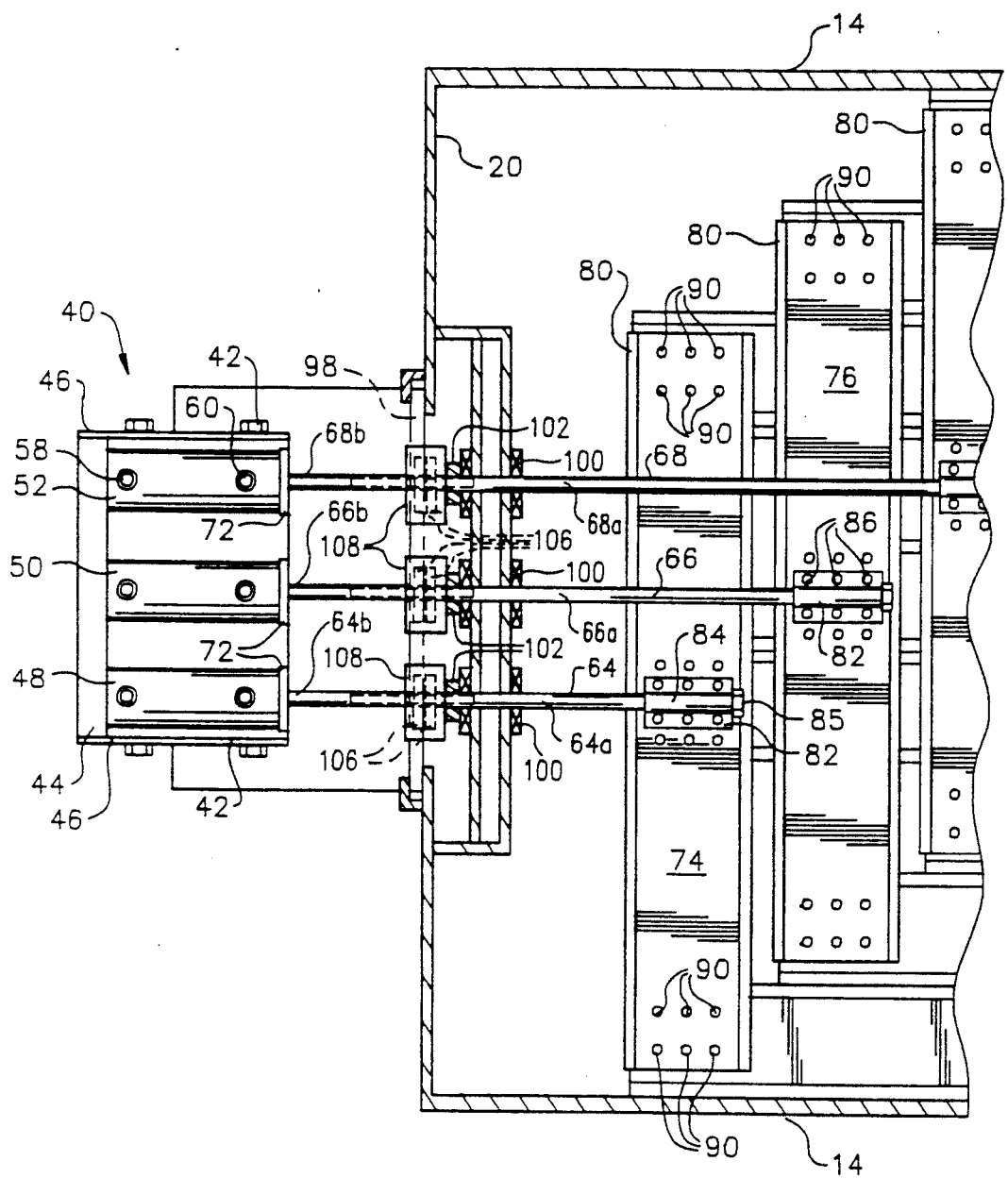
FIG. 6 is an enlarged top view of the drive mechanism and reciprocating floor conveyor of the second embodiment present invention.
Figure 7:
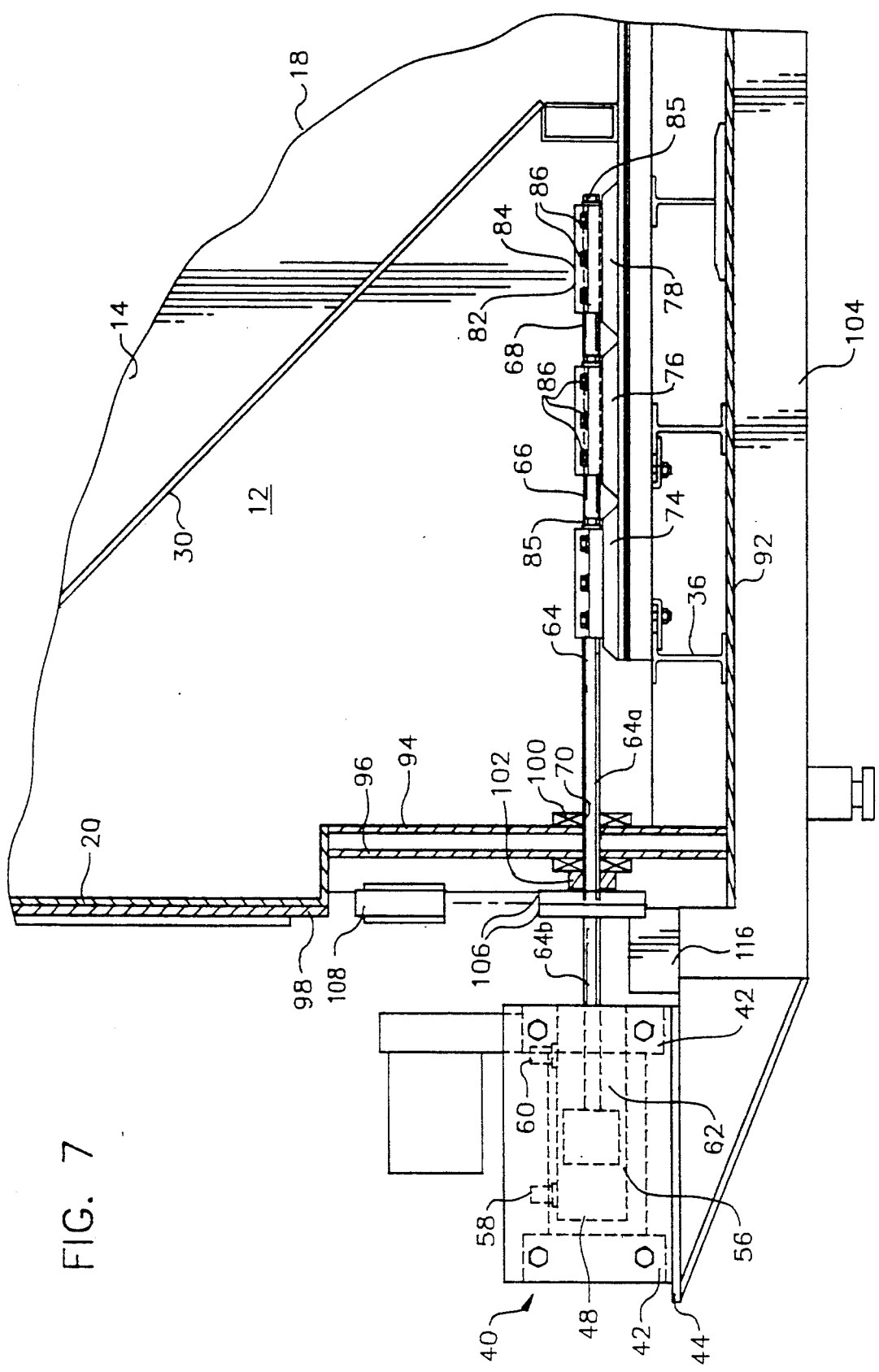
FIG. 7 is an enlarged, partially exposed side view of the drive mechanism of the second embodiment present invention.

Referring to FIGS. 1-4, reciprocating floor conveyor 10 is located within compartment 12 of the container. Compartment 12 is comprised of side walls 14, optional roof 16, rear wall 18 (which may include a door), front wall 20 (which is further referred to herein below as a partitioning bulkhead) and optional floor 22. When the container is a trailer or the like, floor 22 is a king pin plate which only is present on the portion of compartment 12 having partitioning bulkhead 20 which includes king pin 24. Partitioning bulkhead 20 includes compartment cross-member 28 oriented transversely thereon and adjacent to roof 16. Angled plate 30 extends downwardly from compartment cross-member 28 toward reciprocating floor conveyor 10, and is so oriented to prevent passage of material being conveyed underneath angled plate 30.

Preferably, reciprocating floor conveyor 10 is comprised of the plurality of slat groups (slat groups 1, 2, and 3 being shown herein), each comprised of a plurality of longitudinally reciprocatable slats 32. However, more or less than three slat groups may be employed. Each of slats 32 is slidably mounted on a base member 34, which is in turn secured to a plurality of transverse beams 36 by mounting assemblies 38 which do not compromise the structural integrity of base member 34. Reciprocation of slats 32 on base members 34 is accomplished by means of bearings therebetween which are well known in the art. Transverse beams 36 are located on above described floor (or king pin plate) 22 of compartment 12. Most preferably, the reciprocating floor conveyor has a liquid impermeable configuration, as described, for example, in my copending application Ser. No. 07/944,697 filed Sept. 14, 1992 and issued as U.S. Pat. No. 5,228,556 and Ser. No. 07/945,030 filed Sept. 14, 1992 and issued as U.S. Pat. No. 5,222,592 which claim priority from application Ser. No. 07/749,522 filed Aug. 26, 1991, entitled LIQUID-TIGHT RECIPROCATING FLOOR CONSTRUCTION which issued as U.S. Pat. No. 5,165,525, which are incorporated herein by reference.

Drive cylinder housing 40 contains the drive cylinders, which are described in detail below. Drive cylinder housing 40 includes drive cylinder brackets 42 which brace the drive cylinders. Drive cylinder brackets 42 are supported on drive cylinder base 44 which is a platform fixedly secured to both king pin plate 22 and partitioning bulkhead 20 of compartment 12. Drive cylinder sidewalls 46 are secured to drive cylinder brackets 42, drive cylinder base 44, and partitioning bulkhead 20, which is attached to compartment cross-member 28. In turn, compartment cross-member 28 is secured to sidewalls 14 of compartment 12. The above integral configuration of drive cylinder housing 40 with partitioning bulkhead 20, sidewalls 14, compartment cross-member 28, and king pin plate 22 of compartment 12 provide a stable support structure which counteracts the shear and bending forces generated by the drive cylinders during reciprocation of slats 32 of reciprocating floor conveyor 10.

A plurality of drive cylinders are mounted between drive cylinder brackets 42 in drive cylinder housing 40. While more or less drive cylinders can be employed, three drive cylinders, drive cylinder 48, drive cylinder 50, and drive cylinder 52 are shown. Most preferably, the number of drive cylinders employed is equal to the number of groups of slats 32 present in reciprocating floor conveyor 10. Thus, for example, if three groups (1, 2 and 3) of slats 32 are employed, three drive cylinders are used. Drive cylinders 48, 50 and 52 each include a chamber 56 having fluid openings 58 and 60 at opposite ends thereof. Piston 62 is located in chamber 56 and reciprocates therein based upon passage of hydraulic fluid into fluid opening 58 and out of fluid opening 60, and the subsequent passage of hydraulic fluid into fluid opening 60 and out of fluid opening 58. Piston 62 of each of drive cylinders 48, 50 and 52 is attached to drive rod 64, 66 or 68 respectively. Each of drive rods 64, 66 and 68 pass through an opening 70 in partitioning bulkhead 20. Each of drive cylinders 48, 50 and 52 are fixedly secured against partitioning bulkhead 20 with gasket 72 or the like such that a water-tight seal is produced whereby liquid cannot pass from compartment 12 through opening 70 due to the physical obstruction of drive cylinders 48, 50, and 52 and the liquid-tight seal of gasket 72. Hydraulic liquid is supplied to drive cylinders 48, 50 and 52 by means of a hydraulic source, hydraulic lines, and switching valves well known in the art.

Each of drive cylinders 48, 50 and 52 are connected to one of cross-members 74, 76 and 78, by drive rod 64, 66 or 68, respectively. Cross-member 74, 76, and 78 are each located transversely on slats 32 under angled plate 30 to minimize conveyed material from being trapped therebetween. Three cross-members 74, 76 and 78 are described herein but it is to be understood that a fewer or greater number of cross-members can be employed. Preferably, the number of cross-members employed is equal to the number of groups of slats 32 that are used. Thus, in the present example, three cross-members 74, 76 and 78 are used, one for each of the three slat groups 1, 2 and 3 such that cross-member 74 connects all of slats 32 of slat group 1, cross-member 76 connects all of slats 32 of slat group 2, and cross-member 78 connects all of slats 32 of slat group 3. Each of cross-members 74, 76 and 78 connect all of the slats 32 of one of the slat groups 1, 2 or 3 such that extension and retraction of one of drive cylinder 48, 50 or 52 causes extension and retraction of one of drive rods 64, 66 or 68, which in turn causes reciprocation of one of cross-members 74, 76 or 78, resulting in longitudinal reciprocation of all of the slats 32 one of the three slat groups 1, 2 or 3. Each of cross-members 74, 76, and 78 preferably have longitudinal edges 80 which are beveled or angled in order to minimize deposits of the conveyed material between cross-members 74, 76 and 78.

Cross-members 74, 76 and 78 are preferably attached to drive rod 64, 66 and 68, respectively, by cross-member bracket 82 which consists of a sleeve 84 which threadedly engages with the end of drive rod 64, 66 or 68 remote from piston 62 by means of bolt 85. Bolts 86 are employed to secure sleeves 84 to cross-members 74, 76 or 78.

Cross-members 74, 76 and 78 are each fixedly secured to all slats 32 of one of slat groups 1, 2 or 3 by attachment bar 88 located under slat 32. A plurality of attachment bars 88 and one of cross-members 74, 76 or 78 thus sandwich all of slats 32 of one of slat groups 1, 2 and 3, and are securely attached by means of bolts 90.

Referring now to FIGS. 5 through 9, a second embodiment of the present invention is shown which is substantially similar to the first embodiment of the present invention of FIGS. 1 through 4, except that in this second embodiment of the present invention the reciprocatable slats and accompanying base members are separable from the drive cylinder such that a single group of drive cylinders can be employed to interchangeably power a plurality of different sets of slat groups. Thus, due to the separability of the reciprocatable slats and accompanying base members from the drive cylinder in this embodiment, drive cylinder housing 40 is not structurally integral with compartment 12, but is instead separable therefrom. The elements in FIGS. 5 through 9 which are also present in FIGS. 1 through 4 have the same element numbers as those elements in FIGS. 1 through 4. All of the elements of FIGS. 1 through 4 which are the same in FIGS. 5 through 9 are thus incorporated herein for discussion of the second embodiment of the present invention of FIGS. 5 through 9. As will become more readily apparent below, the second embodiment of the present invention provides a reciprocating conveyor configured for detachable mounting on an underlying support, and for detachably coupling of the reciprocating conveyor to a drive assembly carried by the underlying support. The underlying support and drive assembly may be either in the form of a mobile structure or a stationary structure. In either case, the reciprocating conveyor preferably is in a cargo container which may be stacked or transported with other cargo containers that may or may not also include reciprocating conveyors. However, reciprocating conveyors not located in a cargo container may also be employed. Additionally, the underlying support, when a mobile structure, may also be used for carrying cargo containers either with, or without, reciprocating conveyors. It is important to note that the present invention is structured such that when the reciprocating conveyor and underlying support are connected, they function to convey matter on the reciprocating conveyor; however, the reciprocating conveyor and underlying support are also separable such that other underlying supports can be connected to the reciprocating conveyor, and other reciprocating conveyors can be attached to the underlying support.

Figure 8:
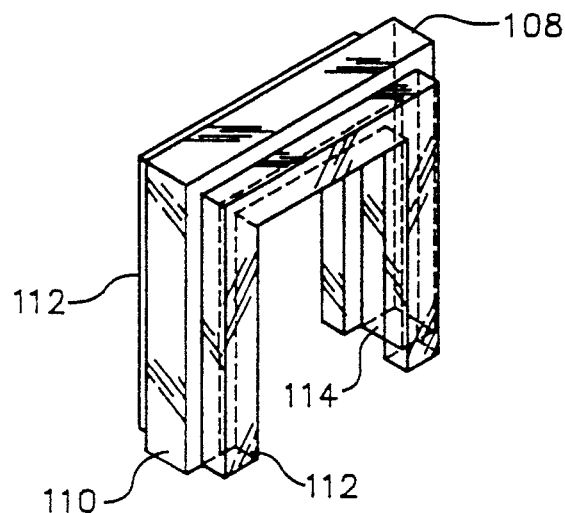
FIG. 8 is a perspective view of the exterior sleeve of the second embodiment of the present invention that is used to connect the separable drive rod portions.
Figure 9:
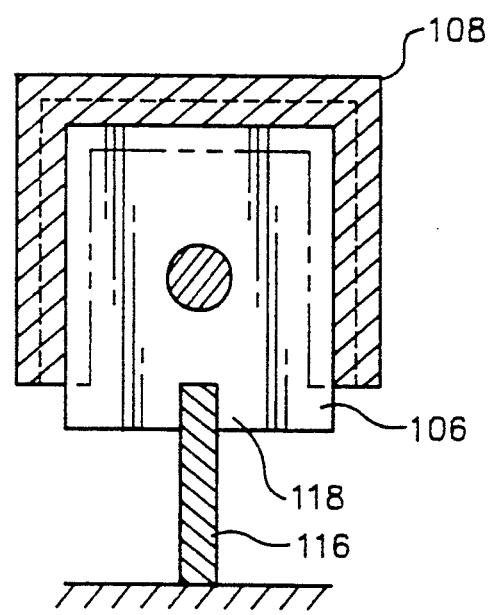
FIG. 9 is a cross-sectional view taken at line 9—9 of FIG. 5 of the second embodiment of the present invention.

Referring now to FIGS. 5 through 9, reciprocating floor conveyor 10, preferably located in container 12, is supported on slat support frame 92. When reciprocating floor container 10 is located within compartment 12, slat supporting frame 92 is floor 22 of compartment 12. End wall 20 of compartment 12 preferably includes recessed end wall 94 which forms a cavity in which cross-member attached portions 64A, 66A and 68A of drive rods 64, 66 and 68, respectively, reside when slat supporting frame 92 and the drive supporting frame, described in detail below, are separated. Preferably, a hinged door 98 is provided on end wall 20 such that, when closed, cross-member attached portions 64A, 66A and 68A are within the compartment formed by secondary end wall 96 and door 98 of compartment 12. Most preferably, secondary end wall 96 is located adjacent to, and parallel with, recessed end wall 94 in order to provide further structural stability of compartment 12. Bearings 100 are secured to recessed end wall 94 and secondary end wall 96 and facilitate sliding movement of cross-member attached portions 64A, 66A and 68A of drive rods 64, 66 and 68, respectively, therein. Spacers 102 are adjacent bearings 100 on secondary end wall 96 and attached to cross-member attached portions 64A, 66A and 68A of drive rods 64, 66 and 68, respectively. Spacers 102 prevent over extension of drive rods 64, 66 and 68 when spacers 102 contact bearings 100 on secondary end wall 96. Drive supporting frame 104 is located under slat supporting frame 92 and can be removably connected thereto by bolts, screws, braces and other attachment components well known in the art. Drive supporting frame 104 supports drive cylinder housing 40, and drive cylinders 48, 50 and 52. Drive cylinder attached portions 64B, 66B and 68B of drive rods 64, 66 and 68, respectively, are oriented to be coaxially aligned with cross-member attached portions 64A, 66A and 68A of drive rods 64, 66 and 68, respectively, when slat supporting frame 92 is located on drive supporting frame 104. An attachment plate 106 is secured, preferably by welding, to each end of cross-member attached portions 64A, 66A and 68A and drive cylinder attached portion 64B, 66B and 68B of drive rods 64, 66 and 68, respectively. Thus, when slat supporting frame 92 is located on drive supporting frame 104, the faces of attachment plates 106 of cross-member attached portions 64A and drive cylinder attached portion 64B of drive rod 64 contact one another. Likewise, the faces of attachment plates 106 of cross-member attached portion 66A and drive cylinder attached portion 66B, and of cross-member attached portion 68A and drive cylinder attached portion 68B of drive rods 66 and 68 also contact. Referring now to FIGS. 8 and 9, exterior sleeves 108 are employed to secure the contacting attachment plates 106 to join cross-member attached portions 64A, 66A and 68A with drive cylinder attached portion 64B, 66B and 68B of drive rods 64, 66 and 68, respectively, to allow reciprocation of slats 32 by drive cylinder 48, 50 and 52. More specifically, exterior sleeve 108 is preferably u-shaped and is comprised of a u-shaped main body 110 with a pair of u-shaped outer members 112. Each of outer members 112 is secured to one of the two sides of main body 110 such that groove 114 is formed within the interior of exterior sleeve 108. Each pair of attachment plates 106 slidably fits in groove 114 of exterior sleeve 108 to secure one of cross-member attached portions 64A, 66A and 68A and one of drive cylinder attached portions 64B, 66B or 68B of drive rods 64, 66 or 68. To separate each pair of attachment plates 106 when slat supporting frame 92 is removed from drive supporting frame 104, exterior sleeve 108 is lifted from the pair of attachment plates 106 to facilitate the aforesaid separation.

Most preferably, drive supporting frame 104 includes a substantially planar drive rod guide 116 fixedly secured thereto and adjacent each pair of attachment plates 106 of cross-member attached portions 64A, 66A and 68A, and drive cylinder attached portions 64B, 66B and 68B of drive rods 64, 66 and 68. Each of attachment plates 106 has a notch 118 on the underside thereof adapted to mate with one of drive rod guides 116 such that attachment plates 106 slidably reciprocate on drive rod guides 116 as drive rods 64, 66 and 68 reciprocate. Thus, the mating of drive rod guides 116 and attachment plates 106 prevent undesirable rotation of drive rods 64, 66 and 68 around their longitudinal axis during reciprocation.

While preferred embodiments of the invention have been illustrated and described, it will be appreciated that various changes can be made therein without departing from the spirit and scope of the invention.

I claim:

1. A reciprocating floor conveyor comprising:
   a slat-supporting frame;
   a plurality of individually reciprocatable groups of slats on said slat-supporting frame, each of said slats having an end;
   drive means adjacent said ends of said slats, said drive means being detachably connected to said slats; and
   a drive-supporting frame being detachably mounted to said slat-supporting frame such that said drive supporting frame releasably engages said slat supporting frame, said drive means remaining with said drive-supporting frame when said drive-supporting frame and said slat-supporting frame are detached.

2. The reciprocating floor conveyor of claim 1 wherein said drive means includes cross-members, and each of said cross-members is an elongated beam having longitudinal edges, said longitudinal edges being beveled.

3. The reciprocating floor conveyor of claim 1 wherein said slat groups are impermeable to liquid, each of said slats mounted on exterior sides of a single unitary base section, said exterior sides of said unitary base section including means for attachment to a side of another base section, said exterior sides of said base section having liquid seal means adjacent thereto.

4. The reciprocating floor conveyor of claim 1 wherein said drive means includes cross-members, and each of said cross-members is secured to each of said slats of one of said slat groups by fixing each of said slats between said cross-member and a bar under said slat.

5. The reciprocating floor conveyor of claim 4 further comprising a substantially planar, angled shield over said cross-members, said shield preventing material being conveyed from contacting said cross-members.

6. The reciprocating floor conveyor of claim 1 wherein said drive means includes drive cylinders, and said drive cylinders abut a wall on said drive-supporting frame to prevent liquid leakage.

7. The reciprocating floor conveyor of claim 1 further comprising a compartment containing said slat groups wherein said drive means is located externally of said compartment.

8. The reciprocating floor conveyor of claim 1 wherein said drive means includes drive rods, drive cylinders, and cross-members, and each of said drive rods is comprised of a drive cylinder attached portion and a cross-member attached portion, said reciprocating floor conveyor further comprising means for detachably connecting said drive cylinder attached portion and said cross-member attached portion of each of said drive rods.

9. The reciprocating floor construction of claim 8 wherein each of said drive cylinder attached portion and said cross-member attached portion of each of said drive rods includes an attachment plate, and said means for detachably connecting said drive cylinder attached portion and said cross-member attached portion is an exterior sleeve adapted for placement over said attachment plates to connect said attachment plates.

10. The reciprocating floor conveyor of claim 9 wherein each of said attachment plates has a notch therein, said reciprocating floor conveyor further comprising a drive rod guide on said drive-supporting frame, said drive rod guide adapted to mate with said attachment plate notch.

11. The reciprocating floor conveyor of claim 1 wherein said drive means includes drive cylinders and cross-members, said reciprocating floor conveyor further comprising a recessed wall between said cross-members and said drive cylinders.

12. The reciprocating floor conveyor of claim 11 further comprising a second wall substantially parallel with said wall between said cross-members and said drive cylinders.

13. A reciprocating floor conveyor comprising:
   a slat-supporting frame;
   a plurality of individually reciprocatable groups of slats on said slat-supporting frame, each of said slats having an end and being impermeable to liquid, each of said slats mounted on exterior sides of a single unitary base section, said exterior sides of said unitary base section including means for attachment to a side of another base section, said exterior sides of said base section having liquid seal means adjacent thereto;
   drive means adjacent said ends of said slats, said drive means being detachably connected to said slats; and a drive-supporting frame detachably mounted to said slat-supporting frame such that said drive supporting frame releasably engages said slat supporting frame, said drive means remaining with said drive-supporting frame when said drive-supporting frame and said slat-supporting frame are detached.

14. The reciprocating floor conveyor of claim 13 wherein said drive means includes cross-members, and each of said cross-members is an elongated beam having longitudinal edges, said longitudinal edges being beveled.

15. The reciprocating floor conveyor of claim 14 wherein each of said cross-members is secured to each of said slats of one of said slat groups by fixing each of said slats between said cross-member and a bar under said slat.

16. The reciprocating floor conveyor of claim 14 further comprising a substantially planar, angled shield over said cross-members, said shield preventing material being conveyed from contacting said cross-members.

17. The reciprocating floor conveyor of claim 13 wherein said drive means includes drive cylinders, and said drive cylinders abut a wall on said drive support frame to prevent liquid leakage.

18. The reciprocating floor conveyor of claim 13 further comprising a compartment containing said slat groups wherein said drive means is located externally of said compartment.

19. The reciprocating floor conveyor of claim 13 wherein said drive means includes drive rods, drive cylinders and cross-members, and each of said drive rods is comprised of a drive cylinder attached portion and a cross-member attached portion, said reciprocating floor conveyor further comprising means for detachably connecting said drive cylinder attached portion and said cross-member attached portion of each of said drive rods.

20. The reciprocating floor construction of claim 19 wherein each of said drive cylinder attached portion and said cross-member attached portion of each of said drive rods includes an attachment plate, and said means for detachably connecting said drive cylinder attached portion and said cross-member attached portion is an exterior sleeve adapted for placement over said attachment plates to connect said attachment plates.

21. The reciprocating floor conveyor of claim 20 wherein each of said attachment plates has a notch therein, said reciprocating floor conveyor further comprising a drive rod guide on said drive-supporting frame, said drive rod guide adapted to mate with said attachment plate notch.

22. The reciprocating floor conveyor of claim 13 wherein said drive means includes drive cylinders and cross-members, said reciprocating floor conveyor further comprising a recessed wall between said cross-members and said drive cylinders.

23. The reciprocating floor conveyor of claim 22 further comprising a second wall substantially parallel with said wall between said cross-members and said drive cylinders.

24. A reciprocating floor conveyor comprising:
a slat-supporting frame;
a plurality of individually reciprocatable groups of slats on said slat-supporting frame, each of said slats having an end;
drive means adjacent said ends of said slats, said drive means being detachably connected to said slats;

a well substantially perpendicular to said slat supporting frame between said slats and said drive means, said drive means including drive rods extending through said wall; and
a drive-supporting frame detachably mounted to said slat-supporting frame such that said drive supporting frame releasably engages said slat supporting frame, said drive means remaining with said drive-supporting frame when said drive-supporting frame and said slat-supporting frame are detached.

25. The reciprocating floor conveyor of claim 24 herein said drive means includes cross-members, and each of said cross-members is an elongated beam having longitudinal edges, said longitudinal edges being beveled.

26. The reciprocating floor conveyor of claim 24 wherein said slat groups are impermeable to liquid, each of said slats mounted on exterior sides of a single unitary base section, said exterior sides of said unitary base section including means for attachment to a side of another base section, said exterior sides of said base section having liquid seal means adjacent thereto.

27. The reciprocating floor conveyor of claim 24 wherein said drive means includes cross-members, and each of said cross-members is secured to each of said slats of one of said slat groups by fixing each of said slats between said cross-member and a bar under said slat.

28. The reciprocating floor conveyor of claim 27 further comprising a substantially planar, angled shield over said cross-members, said shield preventing material being conveyed from contacting said cross-members.

29. The reciprocating floor conveyor of claim 24 further comprising a compartment containing said slat groups wherein said drive means is located externally of said compartment.

30. The reciprocating floor conveyor of claim 24 wherein said drive means also includes drive cylinders and cross-members, and each of said drive rods is comprised of a drive cylinder attached portion and a cross-member attached portion, said reciprocating floor conveyor further comprising means for detachably connecting said drive cylinder attached portion and said cross-member attached portion of each of said drive rods.

31. The reciprocating floor construction of claim 30 wherein each of said drive cylinder attached portion and said cross-member attached portion of each of said drive rods includes an attachment plate, and said means for detachably connecting said drive cylinder attached portion and said cross-member attached portion is an exterior sleeve adapted for placement over said attachment plates to connect said attachment plates.

32. The reciprocating floor conveyor of claim 31 wherein each of said attachment plates has a notch therein, said reciprocating floor conveyor further comprising a drive rod guide on said drive-supporting frame, said drive rod guide adapted to mate with said attachment plate notch.

33. The reciprocating floor conveyor of claim 24 wherein said wall is recessed.

34. The reciprocating floor conveyor of claim 33 further comprising a second wall substantially parallel with said wall.

35. A reciprocating floor conveyor comprising:
a slat-supporting frame;

a plurality of individually reciprocatable groups of slats on said slat-supporting frame, each of said slats having an end;

drive means adjacent said ends of said slats, said drive means including a drive cylinder for each of said slat groups, a cross-member for each of said slat groups securing all of said slats of one of said groups, and a drive rod for each of said slat groups, each of said drive rods adapted to detachably connect one of said drive cylinders and one of said cross-members wherein each of said drive rods is comprised of a drive cylinder attached portion and a cross-member attached portion; means for detachably connecting said drive cylinder attached portion and said cross-member attached portion of each of said drive rods; and a drive-supporting frame adapted to detachably mount said slat-supporting frame, said drive means remaining with said drive-supporting frame when said drive-supporting frame and said slat-supporting frame are detached.

36. A reciprocating floor conveyor comprising:

a slat-supporting frame;

a plurality of individually reciprocatable groups of slats on said slat-supporting frame, each of said slats having an end;

drive means including a drive cylinder for each of said slat groups, a cross-member for each of said slat groups securing all of said slats of one of said groups, and a drive rod for each of said slat groups, each of said drive rods adapted to detachably connect one of said drive cylinders and one of said cross-members wherein each of said drive rods is comprised of a drive cylinder attached portion and a cross-member attached portion; means for detachably connecting said drive cylinder attached portion and said cross-member attached portion of each of said drive rods;

a wall between said cross-members and said drive cylinders, said drive rods extending through said wall; and a drive-supporting frame adapted to detachably mount said slat-supporting frame, said drive means remaining with said drive-supporting frame when said drive-supporting frame and said slat-supporting frame are detached.

37. A reciprocating floor conveyor comprising:

a slat-supporting frame;

a plurality of individually reciprocatable groups of slats on said slat-supporting frame, each of said slats being located on a base section having exterior sides, each of said exterior sides of said base section having liquid seal means adjacent thereto;

drive means including a drive cylinder for each of said slat groups, a cross-member for each of said slat groups securing all of said slats of one of said groups, and a drive rod for each of said slat groups, each of said drive rods adapted to detachably connect one of said drive cylinders and one of said cross-members wherein each of said drive rods is comprised of a drive cylinder attached portion and a cross-member attached portion;

means for detachably connecting said drive cylinder attached portion and said cross-member attached portion of each of said drive rods; and a drive-supporting frame adapted to detachably mount said slat-supporting frame, said drive means remaining with said drive-supporting frame when said drive-supporting frame and said slat-supporting frame are detached.

* * * * *